US008533089B1

(12) United States Patent
Renshaw

(10) Patent No.: US 8,533,089 B1
(45) Date of Patent: Sep. 10, 2013

(54) METHODOLOGY AND PROCESS FOR CONSTRUCTING FACTOR INDEXES

(75) Inventor: Anthony Renshaw, New York, NY (US)

(73) Assignee: Axioma, Inc., New York, NY (US)

( * ) Notice: Subject to any disclaimer, the term of this patent is extended or adjusted under 35 U.S.C. 154(b) by 35 days.

(21) Appl. No.: 12/958,778

(22) Filed: Dec. 2, 2010

Related U.S. Application Data

(60) Provisional application No. 61/265,910, filed on Dec. 2, 2009.

(51) Int. Cl.
*G06Q 40/00* (2012.01)
(52) U.S. Cl.
USPC ........................................................ 705/36 R
(58) Field of Classification Search
USPC ....................................................... 705/36 R
See application file for complete search history.

(56) References Cited

U.S. PATENT DOCUMENTS

| | | | |
|---|---|---|---|
| 7,620,577 B2 | 11/2009 | Arnott et al. | |
| 7,698,202 B2 | 4/2010 | Stubbs et al. | |
| 7,792,719 B2 | 9/2010 | Arnott | |
| 2002/0091605 A1* | 7/2002 | Labe et al. | 705/36 |
| 2003/0046099 A1* | 3/2003 | Lamont et al. | 705/1 |
| 2004/0117284 A1* | 6/2004 | Speth | 705/36 |
| 2006/0253360 A1* | 11/2006 | Gould | 705/35 |
| 2007/0043637 A1* | 2/2007 | Garcia et al. | 705/32 |
| 2008/0021750 A1* | 1/2008 | Masuyama et al. | 705/7 |
| 2008/0071598 A1* | 3/2008 | Masuyama et al. | 705/8 |
| 2010/0114793 A1* | 5/2010 | Eder | 705/348 |

OTHER PUBLICATIONS

R. Litterman, Modern Investment Management: An Equilibrium Approach, John Wiley and Sons, Inc., Hoboken, New Jersey, 2003.

* cited by examiner

*Primary Examiner* — Lindsay M. Maguire
(74) *Attorney, Agent, or Firm* — Law Offices of Peter H. Priest, PLLC

(57) ABSTRACT

Construction of indexes are addressed wherein a portfolio of securities and their associated investment weights or shares is generated. Indexes comprising a plurality of securities can often be bought and sold more cheaply than buying and selling the individual constituents of the index resulting in reduced transaction costs. In passive and enhanced indexing, investments are made with reference to an index. Factor indexes can serve as active manager benchmarks for investable products such as exchange traded funds and mutual funds. Computer based systems, methods and software are addressed for constructing indexes that replicate the returns of a quantitative factor such as medium term momentum or value with the best possible replication of the underlying factor returns. The methodology provides an approach to determine the index even when all desirable characteristics of the index are not simultaneously achievable.

7 Claims, 5 Drawing Sheets

METHODOLOGY AND PROCESS FOR CONSTRUCTING FACTOR INDEXES

The present application claims the benefit of U.S. Provisional Patent Application Ser. No. 61/265,910 filed Dec. 2, 2009, which is incorporated by reference herein in its entirety.

FIELD OF INVENTION

The present invention generally relates to the construction of indexes wherein a portfolio of securities such as stocks, bonds, or the like and their associated investment weights, allocations, or shares are determined. The present invention relates more particularly to improved computer based systems, methods, and software for constructing factor indexes that replicate the returns associated with a quantitative factor such as medium term momentum or value.

BACKGROUND OF THE INVENTION

Indexes can be used as investment tools in various ways. For instance, indexes comprising a plurality of securities can often be bought and sold more cheaply than buying and selling the individual constituents of the index. This allows investment in these securities with reduced transaction costs. In passive and enhanced indexing, investments are made with reference to an index or benchmark portfolio. A benchmark portfolio is a portfolio intended to represent the market in general. The holdings of a benchmark portfolio are often proportional to the market capitalization of each security. Performance statistics such as return and risk are reported with respect to the reference index or benchmark portfolio. Indexes can serve as active manager benchmarks or the underlyers for investable products such as ETFs and mutual funds.

Factor indexes are indexes designed to replicate the returns associated with a selected quantitative factor. Possible factors include those present in commercial risk models. These include style factors, industry factors, market factors, country factors, and currency factors. Axioma's U.S. Equity Fundamental Factor Risk Model uses ten style factors: exchange rate sensitivity, growth, leverage, liquidity, market sensitivity, medium term momentum, short term momentum, size, value, and volatility.

U.S. Pat. No. 7,698,202 describes characteristics, properties and uses of factor risk models. This patent is incorporated by reference herein in its entirety.

Factors are defined quantitatively. For instance, the ten factors in Axioma's U.S. Equity Fundamental Factor Risk Model are defined as follows.

The exchange rate sensitivity factor measures the sensitivity of a stock's historical returns to the returns of a currency basket, referenced in U.S. dollars. The basket used is the International Monetary Fund's Special Drawing Rights (SDR) which contains the currencies U.S. dollar, euro, Japanese yen, and pound sterling. A stock's exchange rate sensitivity factor exposure is the normalized slope obtained by regressing the time series of its past 120 day return against that of the currency basket.

The growth factor gives an indication of a company's historical rate of growth. The growth factor is calculated as the product of the one year return on equity times one minus the dividend payout rate. The return on equity is calculated as the ratio of the annualized income over the last year to the common equity value of a year ago. The dividend payout rate is calculated as the ratio of the annualized dividends per share to the annualized earnings per share. The annualized income over the last year is calculated from income before extraordinary income analogously to dividends per share and earnings per share by going to the most recent filing in the last 520 trading days and summing the four most recently filed values over the previous 15 months. The common equity value of a year ago is taken as the most recent value for common equity that has been filed in the period between 780 and 260 trading days ago, which is approximately three years to one year ago.

The leverage factor provides a measure of a company's exposure to debt levels. The leverage factor is calculated as total debt divided by market capitalization. Total debt is the sum of long term debt and debt in current liabilities, short term debt, taken on the most recent date over the last 520 trading days for which both values have been filed. For market capitalization, the 20 day average is used.

The liquidity factor provides a measure of a stock's trading activity, or lack thereof. It is defined as the natural logarithm of the last 20 day average volume divided by the natural logarithm of the last 20 day average market capitalization, both expressed in currency values such as dollars.

The market sensitivity factor is a measure of a stock's under or over performance relative to the broad market from historical data. It is simply a stock's historical beta calculated by regressing the time series of an asset's returns against the market returns over the preceding 120 trading days. The beta is then adjusted for autocorrelation in the asset returns and asynchronous trading via the Scholes-Williams procedure with a lag/lead of one.

The medium term momentum factor gives a measure of a stock's past performance over the medium term time horizon. It is defined as an asset's cumulative return over the last 250 trading days, excluding the last 20 trading days.

The short term momentum factor gives a measure of a stock's recent performance. It is defined as an asset's cumulative return over the last 20 trading days.

The size factor differentiates between large and small stocks and is defined as the natural logarithm of the market capitalization, averaged over the last 20 trading days. Market capitalization is computed as the product of the total shares outstanding and closing price.

The value factor gives a measure of how fairly a stock is priced within the market. The value factor is calculated as the ratio of common equity to the current market capitalization (i.e. Book-to-Price). The calculation uses the common equity value reported on the most recent date from the last 520 trading days, which is approximately two years. Market capitalization is taken as shares outstanding times the closing price on the day for which the risk model is generated.

The volatility factor gives a measure of an asset's relative volatility over time according to its historical behavior. It is calculated as the square root of the asset's absolute return averaged over the last 60 days, divided by the cross-sectional standard deviation of the risk model's estimation universe.

Axioma's U.S. Equity Statistical Factor Risk Model uses a different set of factors to describe the universe of assets. These factors can be used to define a factor. A factor may be defined by one risk model, while risk and active risk, which is also known as tracking error, is predicted with a different risk model.

There are numerous other possible factors. U.S. Pat. No. 7,620,577 lists a number of these: market price, market capitalization, book value, sales, revenue, earnings, earnings per share, income, income growth rate, dividends, dividends per share, earnings before interest, tax, depreciation and amortization, and the like. This patent is incorporated by reference herein in its entirety.

For many factors, there are many similar methods to quantitatively measure and define the factor score or factor exposure of an asset to the factor. For example, value factors commonly use several similar metrics including the book-to-price ratio, the earnings-to-price ratio, and the earnings-per-share ratios. In fact, Axioma's software is capable of expressing a fully specified risk model in terms of slightly different factors while still giving good risk estimates. Factor indexes constructed using similar factor scores would be similar even if the factor scores were slightly different.

In factor indexes, the goal is to create a set of holdings whose returns replicate the returns associated with one or more factors. The return of a single factor can be defined in numerous ways. It can refer to the return of a long-short, dollar neutral portfolio that is long in those assets with the highest factor scores and short in those assets with the lowest factors scores. The weights can cover a fixed percentage of the assets in the set of securities, measured in terms of capitalization or equal weighting. The weights used for each security can be equally weighted or cap-weighted. Alternatively, the return of a factor can be derived from a regression. This regression can be a cross sectional regression that regresses across assets or a times series regression that regresses over time. Numerous other methods have been proposed for defining the return of a factor, such as the return of a factor mimicking portfolio.

Often an additional desirable characteristic for a factor index is to make the returns of the factor index dissimilar to the returns associated with non-targeted factors. Dissimilar can mean a number of different things. It can refer to uncorrelated returns, or, it can refer to limiting or neutralizing the exposure to a factor, for example. When a factor index is dissimilar to non-targeted factors, it is described as being pure.

The exposure of a portfolio to a factor is often measured with respect to a benchmark portfolio. The exposure of the benchmark portfolio is the sum of the products of the factor scores for each asset times the weight of that asset in the benchmark portfolio. Since this is the exposure of the benchmark, this exposure value is representative of the market in general. The exposure of the factor index is the sum of the products of the factor scores for each asset times the weight of that asset in the factor index. The difference in these two exposures is termed the active exposure. That is, the active exposure is the exposure of the factor index minus the exposure of the benchmark. Small positive or negative active exposures indicate that the factor index is similar to the benchmark. Large positive or large negative active exposures indicate that the factor index is dissimilar to the benchmark. For a pure factor index, the active exposure to the targeted factor is substantially different than zero, while the active exposure of the factor index to non-targeted factors is small.

Exposures and active exposures are often expressed as a Z score, which measures the exposure in terms of standard deviations. An active exposure Z score of 100% indicates that the factor index exposure is one standard deviation greater than the benchmark's exposure. Such a large active exposure would indicate that the exposure of the factor index and the benchmark portfolio are substantially different. A Z score of −100% indicates that the factor index exposure is one standard deviation less than the benchmark's exposure and would also indicate a substantial difference between the factor index and benchmark portfolio exposures. On the other hand, an active exposure Z score between −5% and 5% would indicate that the difference in exposures between the factor index and the benchmark portfolio is less than one twentieth of one standard deviation and would indicate that the two sets of holdings have similar exposures to the factor.

It will be recognized that what constitutes a substantial difference in exposures between the benchmark portfolio and the factor index is a subjective determination by each investor. Whereas some investors may consider a Z score difference of 25% to be small, others may believe that 25% represents a substantial difference. The same may be true for Z score differences of 20%, 30%, 40%, or even 50%.

Factor indexes described in the prior art suffer a number of deficiencies.

Consider first simple factor indexes. Simple factor indexes are sets of holdings created by selecting a universe of potential investments, defining a factor score for each element or asset in the universe, ranking the factor scores, and then buying those assets with the highest scores and selling those assets with the lowest scores. Buying refers to making a long position and selling refers to making a short positions. In some factor indexes, only the highest scores are bought, or, alternatively, only the lowest scores are bought instead of sold. These two alternatives produce long only indexes. The number of assets bought and sold can be determined in many different ways. The number can be related to the market capitalization of the assets or it can be a fixed number. The amount bought or sold in each asset can also be determined in a number of ways including cap-weighting or equal weighting. The simple factor index may or may not be dollar neutral, meaning that the total amount of assets bought equals the total amount of assets sold. As one particular example, consider a 35% cap-weighted, long-short dollar neutral. This simple factor index is created by buying the 35% of a universe measured by market capitalization with the highest factor scores, and selling the 35% of the universe with the lowest scores. The individual asset weights are proportional to market capitalization.

Simple factor indexes have a number of undesirable properties. The turnover and the number of names involved are generally large. This can render investing in the index expensive and impractical. In addition, the resulting portfolios are often not neutral to other factors such as value, leverage, and even size. The returns associated with these simple indexes are not pure returns, but also comprise returns associated with non-vanishing factor exposures. Investment in these simple factor indexes can therefore easily involve unintended bets on other factors.

Another kind of factor index is a factor mimicking portfolio constructed from a matrix of factor exposures. See for example, R. Litterman, Modern Investment Management: An Equilibrium Approach, John Wiley and Sons, Inc., Hoboken, N.J., 2003 (Litterman), which gives detailed descriptions of factor mimicking portfolios and which is incorporated by reference herein in its entirety. Often, the matrix of factor exposures is associated with a factor risk model, but that need not be the case. Factor mimicking portfolios are designed so that they have exposure to one and only one factor. The exposure to all other factors in the risk model or matrix of factor exposures is zero by construction. Factor mimicking portfolios are pure.

Unfortunately, factor mimicking portfolios are expensive to buy and trade. Furthermore, there is no explicit control over the returns associated with these portfolios. In practice, the returns of a factor mimicking portfolio may be quite different than the returns associated with a factor.

A number of new products have been introduced that are similar to simple factor indexes. These new factor index products all explicitly control implementation costs such as turnover, the number of names held, and the like. However, none of these new products use a tracking error constraint or minimize tracking error when constructing the products. Instead, they control or maximize the exposure to the targeted factor.

Factor index products that construct factor indexes by controlling the factor exposure of the target exposure are much more likely to underperform compared to those products that explicitly constrain the tracking error of the factor index. That is, the returns of factor indexes using exposure control are likely to differ from the true factor returns, defined here as the returns of a target factor portfolio.

SUMMARY OF THE INVENTION

Among its several aspects, the invention described herein is designed to overcome various shortcomings associated with known factor index construction methodologies. Expertise in optimization and portfolio construction enables the construction of indexes that are practical to implement, for example, having low turnover, controlled transaction costs, and limited number of names held, and which are neutral to non-target factors. During times of high volatility, it is often impossible to track factor returns well and simultaneously manage index turnover and maintain factor neutrality to other factors. The invention described here is designed so that an advantageous tradeoff between these competing portfolio characteristics is achieved whenever possible. Research indicates that an advantageous tradeoff between competing portfolio characteristics is generally not obtained simply by softening constraints in a prescribed order, as has been proposed in the prior art. Instead, a sequence of different construction optimizations must be used to determine the most advantageous combination of portfolio characteristics.

A further aspect of the present invention relates to improved computer based systems, methods, and software for constructing indexes that replicate the returns of a quantitative factor such as momentum or value.

A further aspect of the present invention relates to improved computer based systems, methods, and software for constructing indexes that replicate the returns of more than one factor simultaneously. That is, a universe of potential investments is constructed that has a large exposure or tilt towards a first factor. For example, there are well known universes which consider stocks with known exposures to size, value or growth. Within this investment universe, a factor index can be constructed that targets a second factor. This produces a factor index associated with more than one factor index.

Another aspect of the invention addresses processes and methodologies by which the index can substantially replicate true factor returns as well as other desirable characteristics. An approach is described to determine the index even when all desirable characteristics of the index are not simultaneously achievable as described further below.

The description that follows describes the construction methodology for one particular, prototypical factor, a momentum factor, for both a large cap universe and a small cap universe. These factor indexes therefore incorporate known characteristics related to two distinct factors: momentum and size. It should be understood that this particular factor index has been presented by way of example only, and not limitation. The methodology, processes, and techniques described would apply equally well to other isolated factors and combined factors for the construction of other factor indexes.

DETAILED DESCRIPTION

Figure 1A:
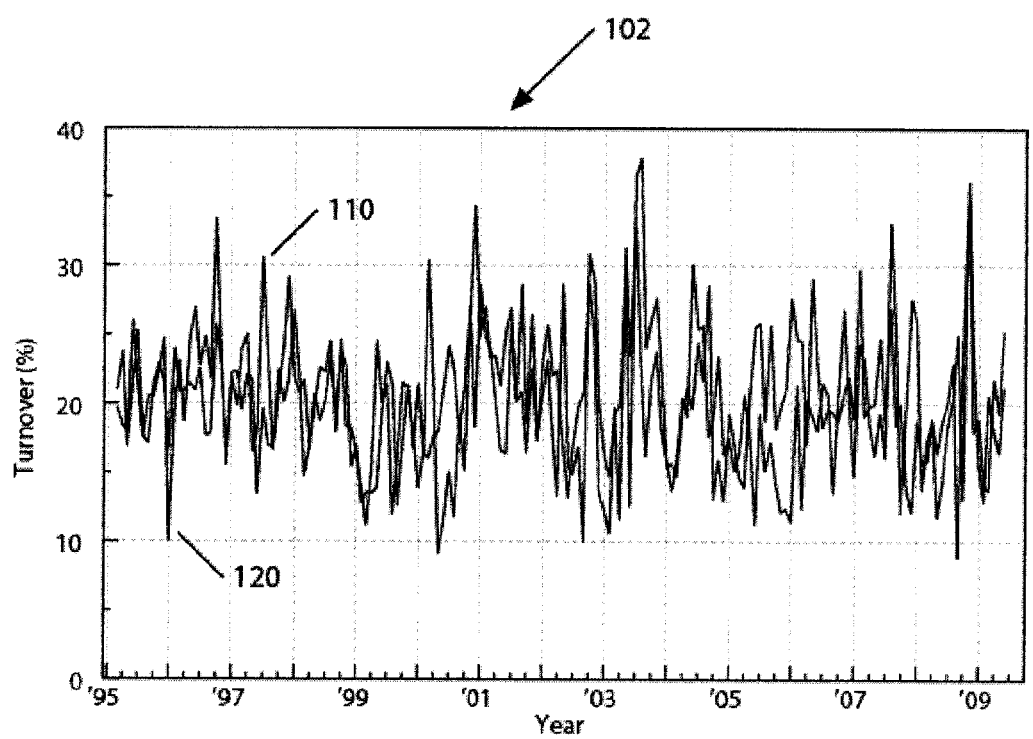
FIGS. 1A and 1B illustrate monthly, one-way, single-side turnover for a simple 35% cap-weighted, long-short momentum index.
Figure 1B:
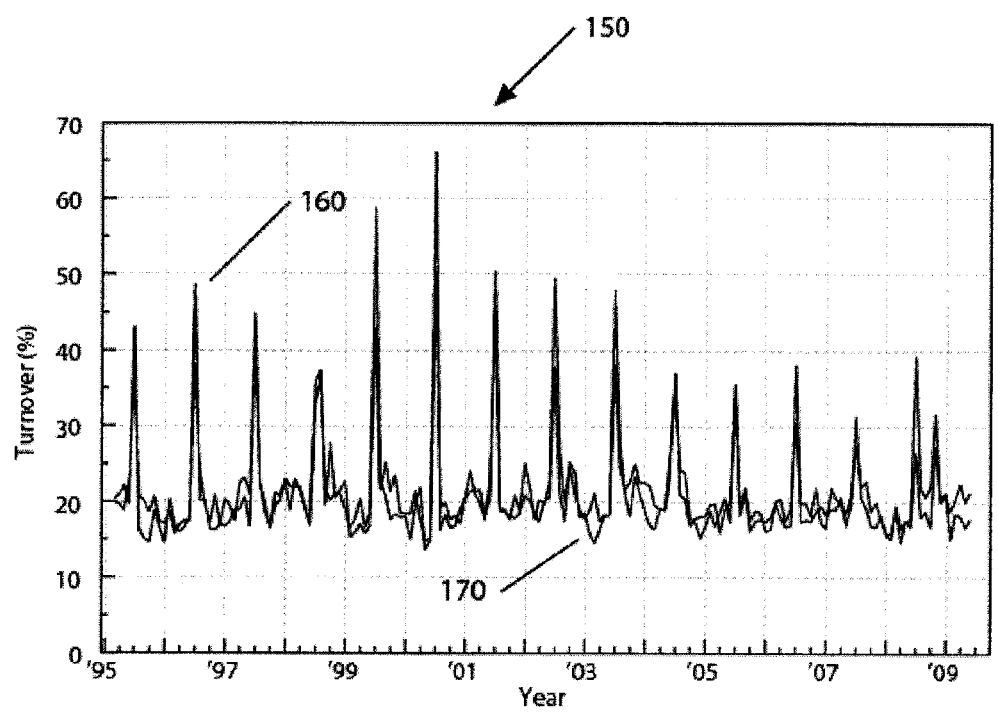

Non-optimized factor indexes normally hold a large number of names and experience large turnover. FIG. 1A shows a graph 102 of the monthly, one-way, single-side turnover for a simple 35% cap-weighted, long-short momentum index based on a large cap universe from January 1995 through June 2009. FIG. 1B shows a similar graph 150 for a small cap universe. The lines 110 and 160 indicate the turnover of the long side, and the lines 120 and 170 show the turnover of the short side. On average, the monthly turnover is 20% for each side. However, the small cap results have annual spikes in turnover associated with an annual reconstitution of the small cap universe itself. This level of turnover is undesirable both for long term and short term investment purposes.

Figure 2A:
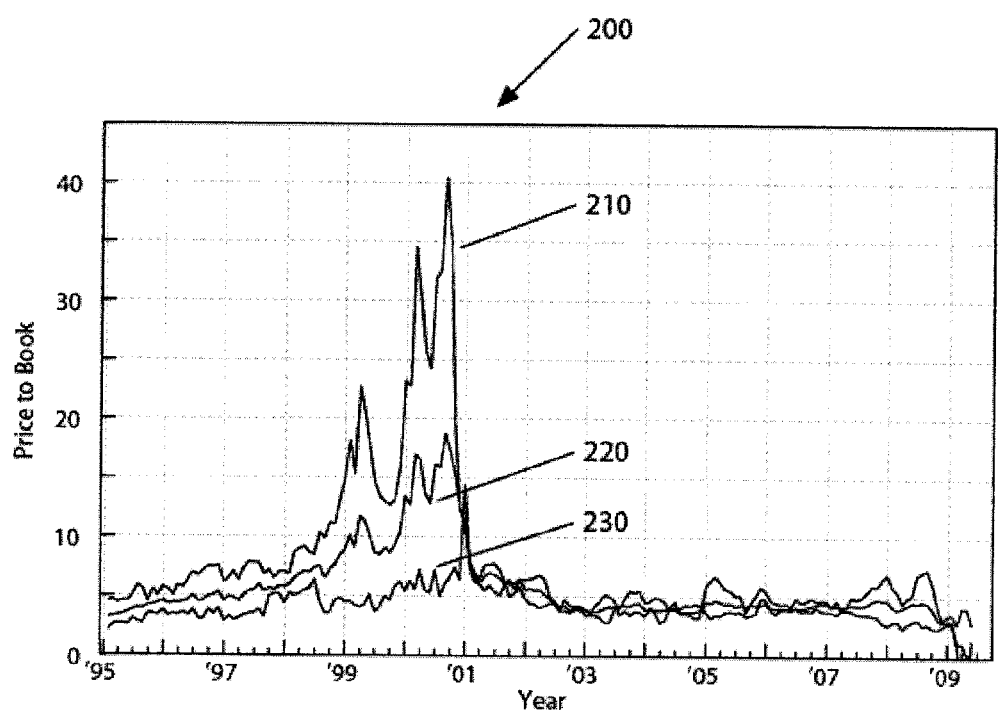
FIGS. 2A and 2B illustrate price to book ratios for a simple 35% cap-weighted, long-short momentum portfolio.
Figure 2B:
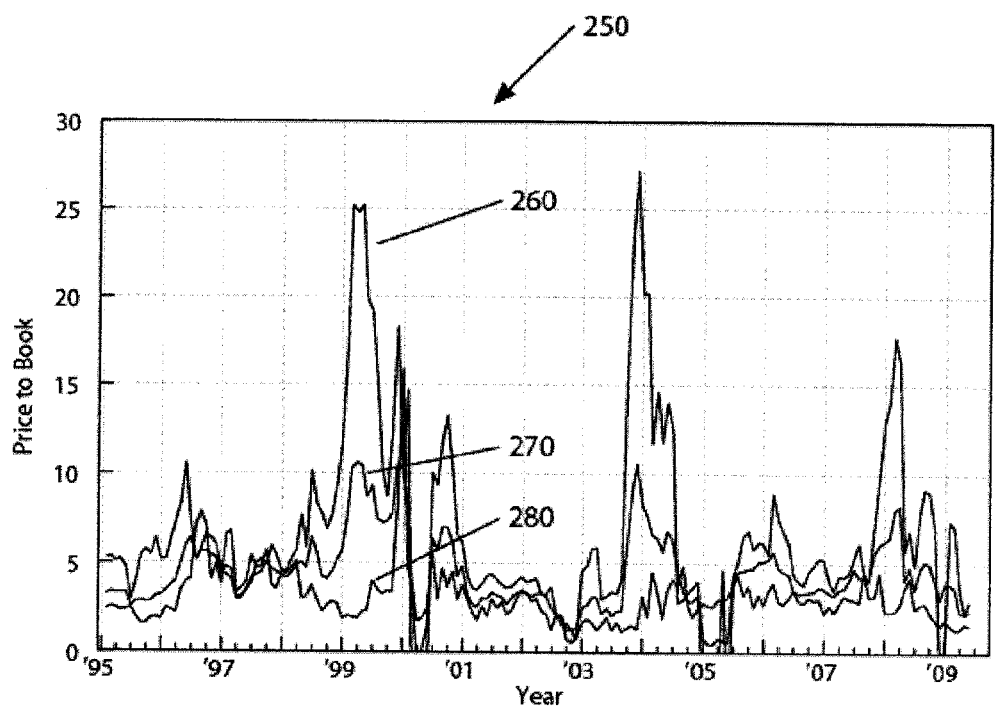

Furthermore, non-optimized indexes often also exhibit strong exposure tilts in other important systemic factors. FIGS. 2A and 2B show graphs 200 and 250 for the price-to-book ratio, a common metric of value, for a simple 35% cap-weighted, long-short momentum index for a large cap and a small cap universe, respectively, from January 1995 through June 2009. The exposure of the long side is shown by the lines 210 and 260, and the absolute exposure of the short side is shown by the lines 230 and 280. The exposure of the benchmark is shown by the lines 220 and 270.

For the large cap universe, there is a strong correlation between momentum and value during 1999-2001. The value exposure of a simple momentum index is long line 210 and short line 230. From 1999-2001, the long line 210 is significantly higher than the benchmark while and the short line 230 is significantly less than the benchmark. In other words, the momentum portfolio has a strong value tilt during this time period. The situation is even more complicated for the small cap universe, which has several periods of strong momentum-value correlation.

Non-optimized factor indexes may be adequate for investment purposes if implementation costs and non-momentum neutrality are not important characteristics. However, when these are important considerations, optimization techniques can be used to embed these characteristics into a factor index while still capturing the return performance associated with the factor.

The construction of a momentum index for two different universes describing large cap and small cap equities is described in detail herein. Each index is intended to be one of a family of factor indexes focusing on factors such as momentum, volatility, liquidity, and leverage. The illustrative indexes track momentum returns closely while simultaneously possessing a number of desirable, practical features related to index implementation and factor neutrality. The optimization methodology used to construct these indexes has been tested extensively with historical backtests to ensure that the realized index characteristics and returns are as intended.

The illustrative indexes are designed to overcome the implementation and trading issues associated with simple factor index construction.

The index construction methodology is designed so that the factor index possesses the best possible combination of portfolio characteristics, or, in the event that it is not possible to obtain all the desirable characteristics, an advantageous tradeoff among these competing portfolio characteristics is achieved.

The momentum indexes are constructed using Axioma's state-of-the-art optimization software and U.S. Equity Fundamental Factor Risk Model. Different universes, different optimization tools, and different factor risk models could also be used. The optimization procedure has been backtested historically since January 1995 to ensure that the resulting indexes track momentum returns closely and possess the other desired implementation and neutrality characteristics.

Optimized factor indexes replicate the return sequence of simple, non-optimized indexes while simultaneously reducing the index implementation costs and improving the momentum signal. The optimized factor indexes replicate the return sequence of simple, non-optimized indexes by imposing a tracking error constraint on the active risk between the optimized factor index and the simple, non-optimized factor index.

The index construction methodology uses state of the art optimization technology to specify exactly how the index is constructed. In this methodology, a series of optimization problems are solved to produce the factor indexes. After solving the first optimization problem, if the characteristics of the portfolio obtained are acceptable, it is used as the actual factor index. If the characteristics of the portfolio obtained are not acceptable, then a second optimization problem is considered. This sequence of optimization problems results in an advantageous tradeoff among competing portfolio characteristics.

The specific quantitative targets of this optimization are the following.

The target factor portfolio is defined to be a simple 35% cap-weighted, long-short, dollar neutral momentum portfolio. This portfolio defines true factor returns. Other factor portfolios could also be used.

The tracking error between the momentum index and a 35% cap-weight long-short momentum target factor portfolio is minimized whenever possible and never greater than 5%. Momentum is defined using the medium term momentum exposure in Axioma's U.S. Equity Fundamental Factor Risk Model.

Whenever possible, the one-way turnover of each side of the momentum index is less than 7.5%. At times, it is impossible to maintain the other index characteristics with this low level of turnover. When this occurs, the turnover is allowed to increase up to 15%. The turnover is also allowed to be greater for the small cap momentum index whenever the small cap universe is reconstituted.

The exposure of the momentum index to all non-momentum, style risk factors in Axioma's U.S. Equity Fundamental Factor Risk Model is less than 25%; in other words, one quarter of one standard deviation of the universe Z scores. The non-momentum exposure of each side of the momentum index (i.e. the long and the short side) is similarly constrained to fall within a quarter of a standard deviation of the corresponding non-momentum exposure of the base universe (i.e. large cap or small cap). These nine style factors are exchange rate sensitivity, growth, leverage, liquidity, market sensitivity, short term momentum, size, value, and volatility.

The index is long-short and is dollar neutral. The index holds only assets that are constituents of the base universe. The index does not hold any assets on a restricted list of assets. The restricted list identifies hard-to-trade assets whose holdings could substantially impact the implementation of the index. The index does not short any assets on a "Do Not Short" list of assets. The "Do Not Short" list identifies hard-to-short assets and assets that cannot be shorted.

For the large cap index, the maximum number of long names is 200 and the maximum number of short names is 200. For the small cap index, the maximum number of long names is 300 and the maximum number of short names is 300. The maximum absolute weight (long or short) in any asset is limited to the smaller of either 2%, or, 10% of the 20 day average daily volume traded based on the long side of the index having a value of ten million U.S. dollars. For example, shares held could not exceed 5,000 in the index if the 20 day average daily trading volume of is 50,000 shares.

In addition to these specifications, additional constraints restricting the holdings, trades, exposures or risk of the index could also be imposed if desired.

The index is rebalanced on a monthly basis.

An important distinction of this illustrative momentum index compared with those described in the literature is that the momentum exposure is not explicitly managed. Instead, tracking error to the 35% cap-weighted long-short momentum target portfolio is substantially reduced and is not more than 5%. Since the goal is to have the momentum index returns be as close as possible to true momentum returns as defined by the returns of the simple momentum index, the appropriate quantitative metric is tracking error, not exposure. Arbitrary exposure constraints do not produce true momentum returns regardless of how large the exposures are.

Turning to the exemplary, detailed methodology, each monthly index construction consists of a sequence of up to three different optimizations performed in a specified order.

The momentum indexes are constructed with the following priorities: low tracking error, low turnover, and non-momentum factor neutrality. Tracking error is the most important property, followed by turnover, and then factor neutrality. These characteristics are achieved using the following sequence of optimizations.

In a first optimization scenario, the objective is to minimize the tracking error between the momentum index and the target factor portfolio subject to the constraints already detailed.

If the momentum index returned as the solution of the above optimization problem has a tracking error of less than 5% (annualized tracking error) and a one-way, one-sided turnover less than 7.5%, this solution is accepted. Otherwise, a second optimization is performed.

In a second optimization scenario, the objective is to minimize turnover subject to a maximum allowable tracking error of 5%.

If the momentum index solution has a one-way turnover for each side of less than 15%, this solution is accepted. Otherwise, a third optimization is performed.

In a third optimization scenario, no objective is considered. Instead, the problem is driven by the following constraints and Axioma's Constraint Hierarchy.

Limit the tracking error between the momentum index and the target factor portfolio to at most 5% annual volatility. This constraint is placed in Axioma's Constraint Hierarchy but is the last constraint to be softened.

The one-way turnover of each side of the momentum index is less than 15%. This constraint is also placed in Axioma's Constraint Hierarchy and, if necessary, will be softened before the tracking error constraint.

The exposure of the momentum index (long minus short) and each side of the index to the base index benchmark to all non-momentum, style risk factors in Axioma's U.S. Equity Fundamental Factor Risk Model is less than 25%. These constraints are placed in Axioma's Constraint Hierarchy and are the first constraints to be softened in the event of infeasibility.

This third solution is always accepted, regardless of any constraints that are softened.

If the turnover of the index universe itself is particularly high in any given month, then the optimization sequence above is modified. The second optimization problem is skipped and the turnover constraint in the other two optimizations scenarios is eliminated.

The present invention may be suitably implemented as a computer based system, in computer software which resides on computer readable media, such as solid state storage devices, such as RAM, ROM, or the like, magnetic storage devices such as a hard disk or floppy disk media, optical storage devices, such as CD-ROM or the like, or as methods implemented by such systems and software.

Figure 3:
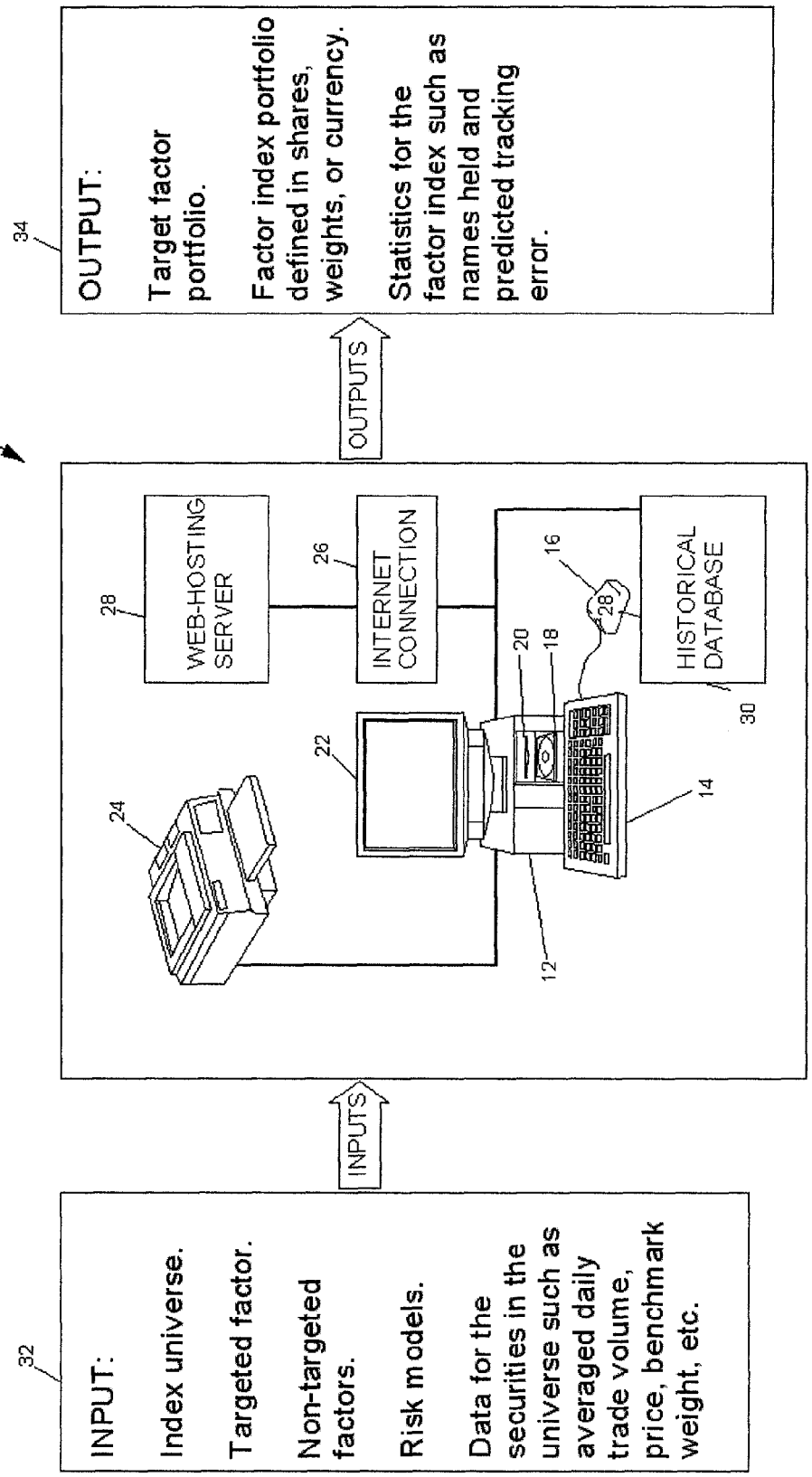
FIG. 3 shows a computer based system which may be suitably utilized to implement the present invention.

FIG. 3 shows a block diagram of a computer system 100 which may be suitably used to implement the present invention. System 100 is implemented as a computer 12, such as a personal computer, workstation, or server. One likely scenario is that the system of the invention will be implemented as a personal computer or workstation which connects to a server or other computer running software to implement the processes of the present invention either through a network, Internet or other connection 26 or via a web hosting connection 28. As shown in FIG. 3 and described in further detail below, the system 100 includes software that is run by the central processing unit of the computer 12. The computer 12 may suitably include a number of standard input and output devices, including a keyboard 14, a mouse 16, CD-ROM drive 18, disk drive 20, monitor 22, and printer 24. In addition, the computer 12 may suitably include an Internet or network connection 26 for downloading software, data and updates or for providing outputs to remote system users. It may also use a web hosting server 28. It will be appreciated, in light of the present description of the invention, that the present invention may be practiced in any of a number of different computing environments without departing from the spirit of the invention. For example, the system 100 may be implemented in a network configuration with individual workstations connected to a server. Also, other input and output devices may be used, as desired. For example, a remote user could access the server with a desktop computer, a laptop utilizing the Internet or with a wireless handheld device such as a Blackberry™, Treo™, or the like.

One embodiment of the invention has been designed for use on a standalone personal computer or workstation.

According to one aspect of the invention, it is contemplated that the computer 12 will be operated by a user, such as a factor index construction employee working in an office setting. However, if desired, it would also be possible to practice the invention with the user using an off-site computer and either loading the below-described software onto the off-site computer or connecting to a server computer running the software.

As illustrated in FIG. 3, and as described in greater detail below, additional inputs 30 may suitably include databases of historical data for back testing and the like, data sources for assets which may be included in portfolios, such as the asset symbols, tickers, or identification number, the current prices of stocks, bonds, commodities, currencies, options, other investment vehicles, and the like, data, such as current factors, risk models and return data, and the like. This data may also include historical information on macroeconomic variables, such as inflation and the rates for United States Treasury bonds of various maturities, for example. It will be recognized that a wide variety of additional inputs may be provided including without limitation other complementary or supplementary software, such as portfolio optimization modeling software, for example.

As illustrated in FIG. 3, and as described in greater detail below, the system inputs 32 may suitably include the index universe, which defines a set of securities over which to define the factor index; a targeted factor, which defines a numerical value for each security in the universe; non-targeted factors, which define numerical values for other factors for the securities in the universe; risk models, which can be used to compute tracking errors; and data for the securities in the universe such as average daily trade volume, price, benchmark weight, and the like.

As further illustrated in FIG. 3, and as described in greater detail below, the system outputs 34 may suitably include the factor index portfolio, defined in terms of shares, weights or currency. It may also include quantitative statistics for the factor index such as the number of names held and the predicted tracking error, or the like. The output information may appear on the monitor 22 or may also be printed out at the printer 24. The output information may also be electronically sent to an index distributor or some other intermediary. Other devices and techniques may be used to provide outputs, as desired.

In one embodiment of the invention, software is utilized to generate a number of computer display screens for receiving inputs from, and providing outputs to, a user of the system.

It is anticipated that the models of the present disclosure will be implemented in software. The software may be stored in any appropriate computer readable medium, such as RAM. The software may be executed on any appropriate computer system, such as the system 12 as shown in FIG. 3.

The optimization problem used to define the index construction can have various alternative formulations. For example, a constraint can be utilized that limits the total risk of the factor index to be a fraction of a benchmark risk value. This and various other alternatives can be used to define different indexes with different properties.

While the present invention has been disclosed in the context of various aspects of presently preferred embodiments, it will be recognized that the invention may be suitably applied to other environments consistent with the claims which follow. For example, while a large number of exemplary factors have been discussed herein, it will be recognized that other factors can be defined. The invention is not limited to the kind of factors considered herein.

I claim:

1. A computer based method of constructing a factor index of portfolio weights comprising:
    selecting a set of possible investments;
    defining a benchmark portfolio comprising a set of holdings in the set of possible investments;
    selecting a first factor risk model defined for the set of possible investments, said first factor risk model comprising a matrix of factor exposures, a matrix of factor covariances, and a matrix of specific risk variances;
    selecting scores of a target factor which is a linear combination of factors defined by the first risk model;
    constructing utilizing a programmed computer a target factor portfolio for the target factor whose holdings are determined by the set of possible investments, the benchmark portfolio, the first factor risk model, and the target factor scores and whose exposure to the target factor scores is different than the exposure of the benchmark portfolio to the target factor scores;

selecting a second factor risk model defined for the set of possible investments, said second factor risk model comprising a matrix of factor exposures, a matrix of factor covariances, and a matrix of specific risk variances, said second factor risk model being different than the first factor risk model;

determining weights of each security for a factor index so that the tracking error between the factor index and the target factor portfolio as predicted by the second risk model is less than a prescribed amount; and outputting the factor index weights as an electronic output by the programmed computer.

2. The computer based method of claim 1 wherein the target factor selected represents a linear combination of one or more of the following metrics: exchange rate sensitivity, growth, leverage, liquidity, market sensitivity, long term momentum, medium term momentum, short term momentum, size, value, volatility, one or more countries, one or more industries, one or more sectors, and one or more currencies.

3. The computer based method of claim 1 wherein the set of possible investments is selected based on a second factor.

4. The computer based method of claim 3 wherein the second factor indicates the country, region, currency, size, value or growth of each element in the universe.

5. The computer based method of claim 4 wherein the country factor comprises U.S. equities.

6. The computer based method of claim 1 further comprising:

limiting the exposure of the factor index to a second factor to insure factor neutrality to the second factor.

7. The computer based method of claim 6 wherein the second factor is a factor defined by the first risk model but is different than the target factor.

* * * * *